United States Patent [19]
Morse

[11] 3,828,834
[45] Aug. 13, 1974

[54] ASSEMBLY FOR CONVERTING A DRILL PRESS TO A WOOD LATHE

[76] Inventor: Glenn B. Morse, 321 Fountain St. N.E., Grand Rapids, Mich. 49502

[22] Filed: Nov. 29, 1972

[21] Appl. No.: 310,649

[52] U.S. Cl............ 144/1 C, 29/26 R, 29/27 A, 90/17, 408/20, 408/236
[51] Int. Cl............................................. B27c 9/02
[58] Field of Search....... 408/20, 236; 144/1 R, 1 C, 144/1 G, 1 H; 29/26 R, 26 A, 26 B, 27 A, 27 B, 568; 90/17; 83/477, 477.1, 477.2, 478, 698

[56] References Cited
UNITED STATES PATENTS

| 2,089,362 | 8/1937 | Haas | 144/1 C |
| 2,200,799 | 5/1940 | Miller | 144/1 C |
| 2,226,029 | 12/1940 | Taylor | 144/1 C |
| 2,623,269 | 12/1952 | Goldschmidt | 408/20 X |
| 2,963,057 | 12/1960 | Morse | 144/1 C |
| 3,410,326 | 11/1968 | Paquin | 408/20 X |

Primary Examiner—Andrew R. Juhasz
Assistant Examiner—W. D. Bray

[57] ABSTRACT

A drill press of a type in which the column is mounted on a fulcrum stand is provided with attachments through which work pieces are supported and rotatively driven, and the drill press table is used as a support for a tool rest adapted to both wood-turning and block-turning procedures.

3 Claims, 11 Drawing Figures

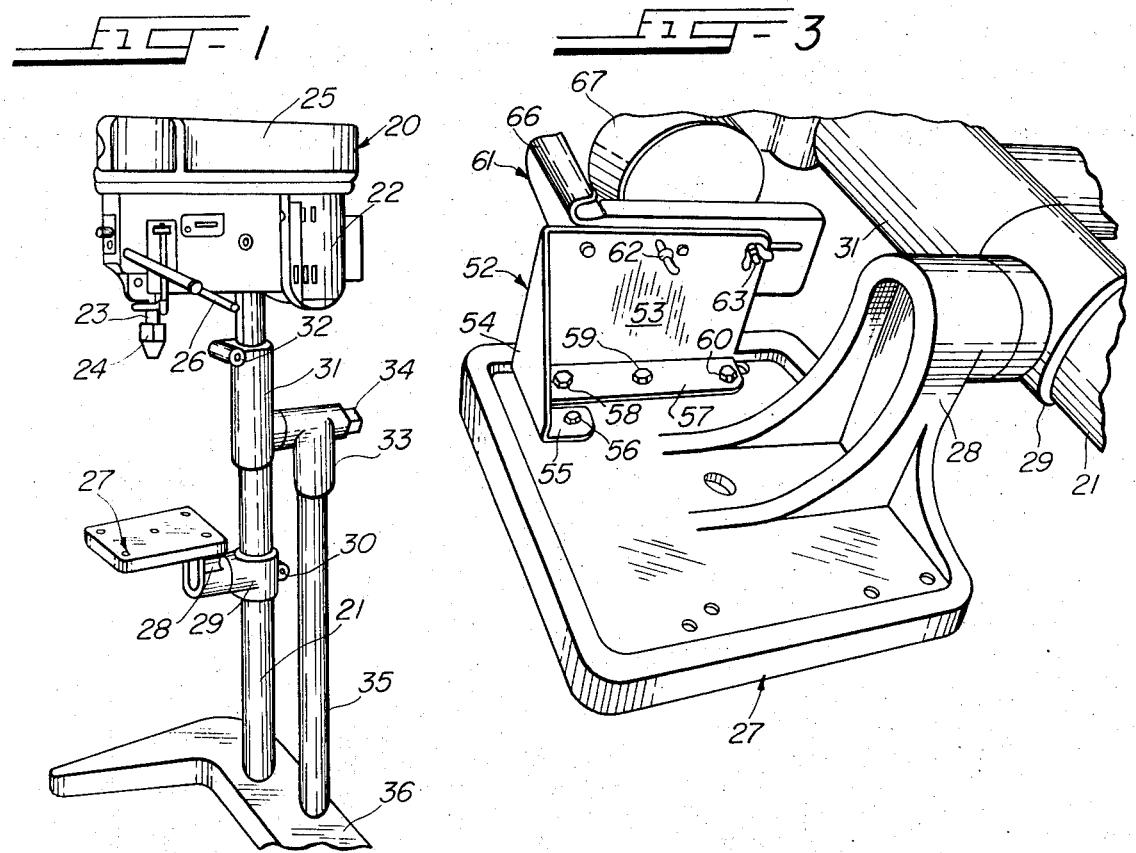
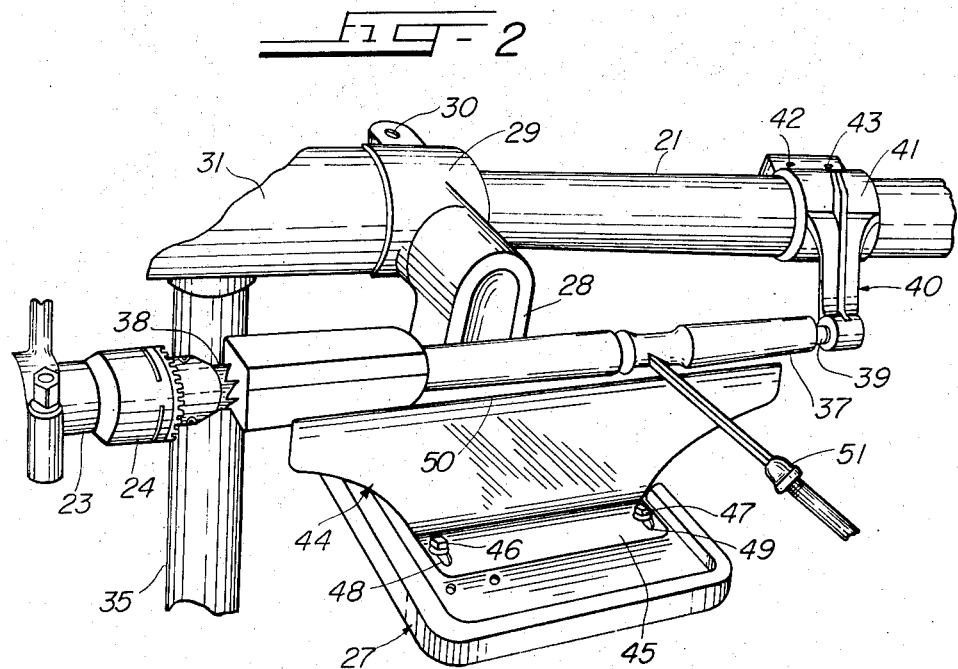

ASSEMBLY FOR CONVERTING A DRILL PRESS TO A WOOD LATHE

BACKGROUND OF THE INVENTION

General-purpose wood lathes are comparatively simple machines in which the primary components include a frame, a spindle mounted on the frame for relatively high-velocity-rotation, a tool rest adjustably mounted on the frame in operating relationship with the axis of rotation of the spindle, and usually a tail stock for supporting the end of the work piece opposite from the end engaged by the spindle. In turning the periphery of long and comparatively slender pieces (such as table legs), the work piece is held between a center mounted in the tail stock and a driving center mounted in the spindle. For block-turning (as in making bowls), a fitting is first secured to the rough block of wood, and the fitting is then interengaged with the spindle. The cutting action is performed by manually-held tools supported by the tool rest close to the work being turned. The general form of this type of machine is very old, and is probably one of the first production machines known to man.

One of the most common stationary power-driven machines is the drill press. Its universal use and inevitable presence in any machine shop has stimulated many efforts to provide multiple-utility for this machine. A specilized version of the drill press is described in my U.S. Pat. No. 2,963,057, the primary characteristic of which is the mounting of the column carrying the power head on a fulcrum stand which permits the machine to be placed in an attitude such that the column and the spindle of the power head are in a horizontal position. The present invention is preferably based upon the utilization of this type of drill press.

SUMMARY OF THE INVENTION

The spindle of the standard power head of a drill press is utilized as a spindle of a wood lathe by mounting a tool rest on the table of the drill press, preferably when the table is adjusted to a position in which the table surface is in a plane parallel to the spindle axis. This position is approximately 90 degrees from the usual drill press table position, with the rotation taking place about an axis perpendicular to the column. With the table in this position, it functions both as a support for the tool rest, and as a surface usable for placement of tools and other equipment. The adjustability built into the standard drill press for other purposes, such as the axial adjustability of the quill assembly (associated with the feed movement of the drill press) and the rotatability of the column with respect to the table about the column axis, makes the wood lathe combination easily adaptable to an endless variety of shapes and sizes of work pieces. For spindle turning, a tail stock is added to the drill press column, together with a driving spur held in the drill press chuck. For block turning, a fitting securable to rough blocks has a cylindrical extension receivable within the drill press chuck to hold and drive the work piece.

DESCRIPTION OF THE DRAWINGS

FIG. 1 is a perspective front quarter view of a drill press of a type preferably used in conjunction with the present invention, shown in the erect position to function as a drill press.

FIG. 2 is a fragmentary front perspective view showing the drill press column placed in the horizontal position, and equipped to function as a wood lathe for spindle turning.

FIG. 3 is a perspective front view showing the assembly adapted for block-turning.

DESCRIPTION OF THE PREFERRED EMBODIMENTS

Figure 4:
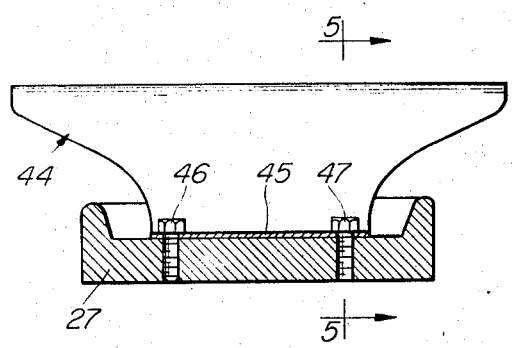
FIG. 4 is a sectional front view on a vertical plane showing the mounting of the tool rest appearing in FIG. 2.

The specialized drill press shown in FIG. 1 includes the power head generally indicated at 20 mounted on the front column 21. The power head includes a motor 22, a spindle 23 carrying a chuck 24, and a belt power-transfer system from the motor to the spindle 23 contained within the hood 25. Rotation of the feed handle 26 will induce axial movement of the spindle 23 to provide a feed for drills held within the chuck 24 as they engage work pieces supported on the table 27. This table has an offset arm 28 pivotally connected at its lower extremity (as viewed in FIG. 1) to the table bracket 29 slidably and rotatively engaging the column 21. A locking bolt 30 can be tightened to constrict the bracket 29 about the column to lock the assembly in position.

The column 21 is slideably and rotatively received within the clamping member 31, and the bolt 32 can be tightened to constrict the upper portion of the clamping member 31 about the column to lock the rotative and axial position of the power head with respect to the member 31. A shaft (not shown) secured to the clamping member 31 traverses the upper portion of the pivot member 33, and terminates at the nut 34. Tightening of this nut will determine the resistance of rotation of the clamping member (together with all of the components carried by the column 21) with respect to the pivot member 33. The rear column 35 extends from the fulcrum member 33 to the "U"-shaped base 36 to form a stand capable of placement of the column 21 in positions between that appearing in FIG. 1, and a horizontal position of the column 21 appearing in FIGS. 2 and 3.

Figure 5:
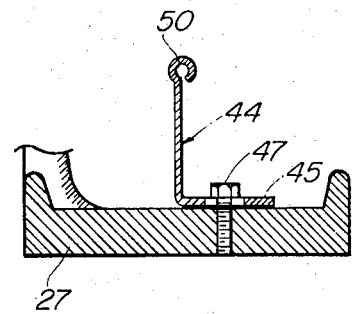
FIG. 5 is a section on the plane 5—5 of FIG. 4.

The machine shown in FIG. 1 is convertable to a spindle-turning wood lathe by incorporating the components shown in FIG. 2. An elongated piece of wood indicated at 37 is held between a conventional driving spur 38 mounted in the chuck 24 and a center member 39 mounted in the tail stock 40. This tail stock has a clamping portion 41 embracing the column 21, which can be constricted into clamping relationship with the column by tightening the bolts 42 and 43. A tool rest 44 has a mounting flange 45 secured to the table 27, with the table placed in a position such that the under side of the table, as shown in FIG. 1 is uppermost. The offset arm 28 places this mounting surface in a position displaced conveniently downward from the axis of rotation of the drill press spindle 23, when that axis is horizontally opposite the axis of the column 21. Bolts as shown at 46 and 47 traverse elongated holes 48 and 49 in the flange 45 to provide an adjustable placement of the supporting surface 50 of the tool rest. The surface 50 is preferably approximately horizontally opposite the axis of rotation of the spindle 23, and consequently of the axis of rotation of the work piece 37. Referring to FIG. 5, the supporting edge 50 may be provided by a rolled portion of the sheet material constituting the tool rest 44, which provides not only a conveniently-shaped surface but also a considerable degree of additional stiffening. Manually-held cutting tools as shown at 51 in FIG. 2 are supported by the edge 50 as they engage the work piece 37.

Figure 6:
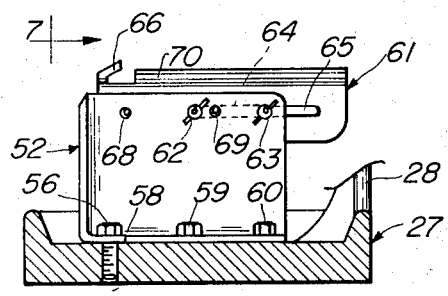
FIG. 6 is a sectional elevation on a plane perpendicular to the axis of rotation of the spindle, showing the attachment of the tool rest appearing in FIG. 3.
Figure 7:
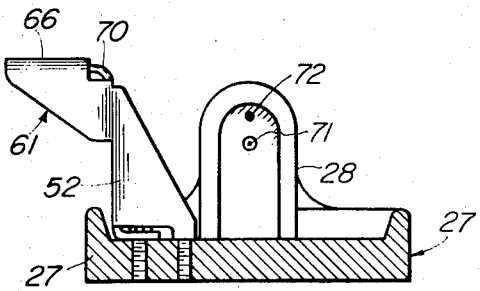
FIG. 7 is sectional elevation on the plane 7—7 of FIG. 6.

The machine is prepared for block-turning by incorporating the tool rest structure shown in FIGS. 6 and 7, which is installed as shown in FIG. 3. This tool rest includes a base section 52 preferably formed integrally of sheet steel, and includes the panel 53 and the side flange 54. The side flange 54 terminates at its lower portion in the foot 55 secured to the table 27 by the bolt 56. The lower extremity of the panel 53 terminates in the flange 57, which is secured to the table by bolts as shown at 58-60. An adjustable tool-support indicated generally at 61 is secured to the base member 52 by bolt and nut assemblies 62 and 63. These traverse the elongated slots 64 and 65, respectively, in the member 61, providing lateral adjustability to accomodate the position of the side rest portion 66 to the diameter of the block 67 being turned. The base member 52 has an additional set of holes as indicated at 68 and 69, which are positioned to engage the slot 64 and 65 in a position in which the member 61 is moved substantially to the left, as appearing in FIG. 8, thus giving two ranges of sliding adjustability. The placement of the transverse tool-supporting surface 70 with respect to the block 67 is preferably accomplished by adjustment of the handle 26, which moves the spindle axially toward and away from the tool support. FIG. 7, incidentally, illustrates the position of the pivot bolt 71 engaging the table bracket 29, about which the table 27 is rotatably mounted. A locking bolt 72 is preferably included at a position eccentric to the axis pivot bolt 71, which also is engageable with the pivot bracket to lock the selected position of the table about the bolt 71.

Figure 8:
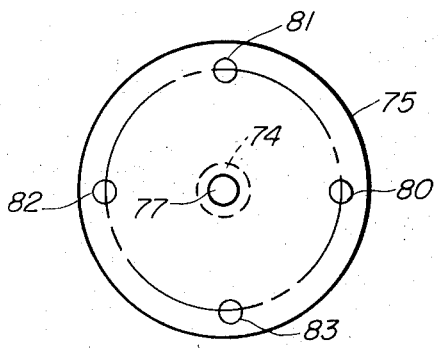
FIG. 8 is a front elevation of a driving member of a type used to hold a block in the relationship shown in FIG. 3.
Figure 9:
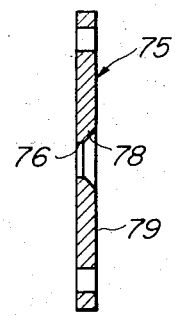
FIG. 9 is a sectional elevation of the plate portion of the fitting illustrated in FIG. 8.
Figure 10:
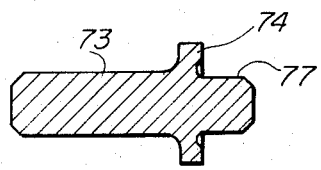
FIG. 10 is a axial sectional view of the arbor portion of fitting shown in FIG. 8.
Figure 11:
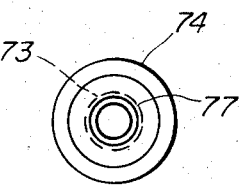
FIG. 11 is a front view of the arbor shown in FIG. 10.

The fitting used to support the block 67 in the chuck 24 is illustrated in FIGS. 8 through 11. The arbor portion of the assembly shown in FIG. 8 is illustrated in FIG. 10, and has the cylindrical portion 73 engagable with the chuck 24. A flange 76 provides an abutment surface against which the plate 75 can be pressed to establish a position of the plate perpendicular to the axis of rotation of the spindle. The central portion of the plate has an opening 76 engagable with the projection 77 of the arbor, which is then headed over in the manner of a rivet to maintain the assembled relationship. The countersunk portion 78 at the opening 76 permits the expanded diameter resulting from the heading operation to be maintained below the support surface 79, so as not to interfere with the placement of the block 67 shown in FIG. 3. A group of holes 80-83 are provided in the plate 75 for receiving wood screws engaging the block 67 to hold it securely in position for the turning operations.

I claim:

1. In combination with a drill press having a column, a power head mounted on said column and having a spindle with an axis parallel to said column, said spindle including a chuck, said drill press also including a table mounted on said column and adjustable about an axis perpendicular to said column, said powerhead and table also being angularly adjustable about the axis of said column, and support means adapted to position said column at least horizontally, an assembly for converting said drill press to a wood-turning lathe when said column is in the said horizontal position, said assembly comprising:

tool rest means normally secured to said table, said tool rest means providing a tool-support surface in working relationship to the axis of rotation of said spindle wherein said tool-support surface comprises two parts defining a first support surface transverse to said spindle axis, and a second support surface extending parallel to said axis, and said assembly additionally includes a workpiece-holding member normally mounted in said chuck.

2. A combination as defined in claim 1, additionally including a driving center normally mounted in said chuck, and tailstock means mounted on said column.

3. A machine as defined in claim 1, additionally including tailstock means adapted to receive and locate the opposite end of said workpieces from said spindle, said tailstock means being rotatively adjustable about the axis of said beam.

* * * * *